US011940767B2

(12) United States Patent
Hennessy et al.

(10) Patent No.: US 11,940,767 B2
(45) Date of Patent: Mar. 26, 2024

(54) SYSTEMS AND METHODS OF OPERATING A COLLABORATIVE BUILDING NETWORK

(71) Applicant: Johnson Controls Tyco IP Holdings LLP, Milwaukee, WI (US)

(72) Inventors: Ronan Fineen Hennessy, Carrigaline (IE); Róisín Ann O'Brien, Glanmire (IE); Eamonn Jerry O'Toole, Ballincollig (IE)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 8 days.

(21) Appl. No.: 17/705,830

(22) Filed: Mar. 28, 2022

(65) Prior Publication Data

US 2023/0288892 A1 Sep. 14, 2023

Related U.S. Application Data

(60) Provisional application No. 63/318,720, filed on Mar. 10, 2022.

(51) Int. Cl.
*G05B 19/042* (2006.01)

(52) U.S. Cl.
CPC .. *G05B 19/042* (2013.01); *G05B 2219/25011* (2013.01); *G05B 2219/2614* (2013.01)

(58) Field of Classification Search
CPC ........ G05B 19/042; G05B 2219/25011; G05B 2219/2614
See application file for complete search history.

(56) References Cited

U.S. PATENT DOCUMENTS

| | | | | |
|---|---|---|---|---|
| 2005/0021655 | A1* | 1/2005 | Liu | G06F 11/3612 709/213 |
| 2018/0046149 | A1* | 2/2018 | Ahmed | G05B 13/026 |
| 2019/0334779 | A1* | 10/2019 | Woodward | G06F 16/9024 |
| 2019/0347920 | A1* | 11/2019 | Anderson | G08B 13/1672 |

FOREIGN PATENT DOCUMENTS

| | | | | |
|---|---|---|---|---|
| WO | WO-2019159101 A1 * | 8/2019 | | G06F 16/61 |

* cited by examiner

*Primary Examiner* — Michael W Choi
(74) *Attorney, Agent, or Firm* — Foley & Lardner LLP

(57) ABSTRACT

Systems and methods of operating a collaborative building network are disclosed. In one aspect, a method of operating a building management system includes acquiring, by a first computing system, data using one or more sensors of a first building of a first entity, providing, by the first computing system, a set of sharing rules for the acquired data, determining, by the first computing system by applying the set of sharing rules, whether to share the acquired data with a second computing system associated with a second building of a second entity, and providing, by the first computing system, the acquired data to the second computing system responsive to the determination.

18 Claims, 9 Drawing Sheets

SYSTEMS AND METHODS OF OPERATING A COLLABORATIVE BUILDING NETWORK

CROSS REFERENCE TO RELATED APPLICATION

This application claims the benefit under 35 U.S.C. § 119(e) of the following provisional application: U.S. Ser. No. 63/318,720, entitled "SYSTEMS AND METHODS OF OPERATING A COLLABORATIVE BUILDING NETWORK," filed Mar. 10, 2022, all of which is incorporated herein by reference in its entirety.

BACKGROUND

This application relates generally to a building management system of a building. This application relates more particularly to methods of systems for using a building management system within a collaborative building network to make predictions and respond to those predictions.

A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. A BMS typically stores any data generated by these systems and/or sends the data to a server for future use.

SUMMARY

One aspect of the present disclosures includes a method of operating a building management system including acquiring, by a first computing system, data using one or more sensors of a first building of a first entity, providing, by the first computing system, a set of sharing rules for the acquired data, determining, by the first computing system by applying the set of sharing rules, whether to share the acquired data with a second computing system associated with a second building of a second entity, and providing, by the first computing system, the acquired data to the second computing system responsive to the determination.

In some embodiments, the first computing system is connected to the first building.

In some embodiments, the first computing system includes a server connected, via a network, to the second computing system and a third computing system connected to the first building.

In some embodiments, the method further includes facilitating, by the first computing system, sharing of the data between the first entity and the second entity.

In some embodiments, the method further includes facilitating, by the first computing system, sharing of the data between the first entity and a third entity based on the set of sharing rules, wherein the sharing rules for the second entity is different from the sharing rules for the third entity.

In some embodiments, the method further includes grading the data based on at least one of precision or sampling rate of the acquired data, wherein the determination of whether to share the acquired data with the second computing system is based on the graded data.

In some embodiments, provision of the acquired data to the second computing system includes filtering out at least some of the acquired data based on the grading or the set of sharing rules.

In some embodiments, the method further includes: receiving data, from the second computing system, acquired using one or more sensors of the second building of the second entity; and predicting an event that will impact occupants of the first building based on data received from the second building.

In some embodiments, the method further includes operating building equipment in response to the predicted event.

In some embodiments, the acquired data includes data related to at least one of the following: a weather event, occupancy, criminal activity, atmospheric quality, environmental condition, or pedestrian activity.

Another aspect is a non-transitory computer-readable storage medium having instructions stored thereon that, when executed by one or more processors, cause the one or more processors to acquire data using one or more sensors of a first building of a first entity, provide a set of sharing rules for the acquired data, determine, by applying the set of sharing rules, whether to share the acquired data with a second processor associated with a second building of a second entity, and provide the acquired data to a second processor responsive to the determination.

In some embodiments, the instructions further cause the one or more processors to facilitate sharing of the data between the first entity and the second entity.

In some embodiments, the instructions further cause the one or more processors to store the data in a database and erase the data from the database after storing the data for a predetermined period.

In some embodiments, the instructions further cause the one or more processors to grade the data based on at least one of precision or sampling rate of the acquired data.

In some embodiments, the instructions further cause the one or more processors to receive data, from the second processor, acquired using one or more sensors of the second building of the second entity.

In some embodiments, the instructions further cause the one or more processors to predict an event that will impact occupants of the first building based on data received from the second building and operate a building equipment in response to the predicted event.

Another aspect is a building management system including one or more storage devices storing instructions thereon and one or more processors, wherein the one or more processors execute the instructions causing the one or more processors to acquire data using one or more sensors of a first building of a first entity, provide a set of sharing rules for the acquired data, wherein the rules comprise rules regarding at least one of what data can be shared, how much of the data can be shared, and how frequently it can be shared, determine, by applying the set of sharing rules, whether to share the acquired data with a second processor associated with a second building of a second entity, and provide the acquired data to the second processor responsive to the determination.

In some embodiments, the one or more processors are further configured to receive data, from the second processor, acquired using one or more sensors of the second building of the second entity.

In some embodiments, the one or more processor are further configured to predict an event that will impact occupants of the first building based on the data received from the second building and operate a building equipment in response to the predicted event.

In some embodiments, the one or more processors are further configured to train a machine learning model used to predict the event based on the data from the second building and input of whether the predicted event occurred.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to the FIGURES, systems and methods for operating a collaborative building network are disclosed, according to various exemplary embodiments. Typically, data obtained from a smart building is isolated within that smart building or a local smart building network. This means that all of the useful data obtained by Internet-of-Things (IoT) sensors, access control systems, security systems, etc. is not accessible by other smart buildings or non-IoT enabled buildings. However, this data may be useful to other buildings or networks. For example, if a first building detects flooding, then this information would be useful to a second building that may subsequently experience flooding because the second building is at a lower elevation or further downstream of a river. As another example, if a first building detects a sudden increase in pedestrians around the first building, occupants of a second building may find this information useful so that the occupants may plan to leave before the rush.

The present disclosure describes systems and methods for operating a collaborative building network including a plurality of smart buildings that are able to share data with one another. The smart buildings may use a data grading and data sharing mechanism so that buildings can leverage data from other sources in the vicinity (or farther away) to better refine their building preparations and automated responses.

Data received from other smart buildings may be used to train machine learning models and predict future events so that the owner/occupant of the smart building may be prepared. Furthermore, the smart buildings may profit financially by generating high quality data that other buildings may want. Depending on embodiments, the data may be downgraded before it is transmitted to requesting smart buildings in order to equalize or balance the data sharing. Or requesting smart buildings may alternatively provide some compensation to the generator (e.g., another smart building with high quality sensors).

Once an event is detected as predicted to occur, the smart building may automatically respond by taking measures to prevent damage or save money. For example, if a smart building predicts that pedestrian activity around the smart building will drastically increase due to the end of a major sporting event nearby, the smart building may automatically send notifications to the occupants so that the occupants may leave prior to the pedestrian rush. As another example, when a first smart building detects an armed robbery right outside the building, the first smart building may provide that data to a nearby second smart building which may automatically warn the occupants to take cover and/or close and lock the doors.

Building Management System Overview

Figure 1:
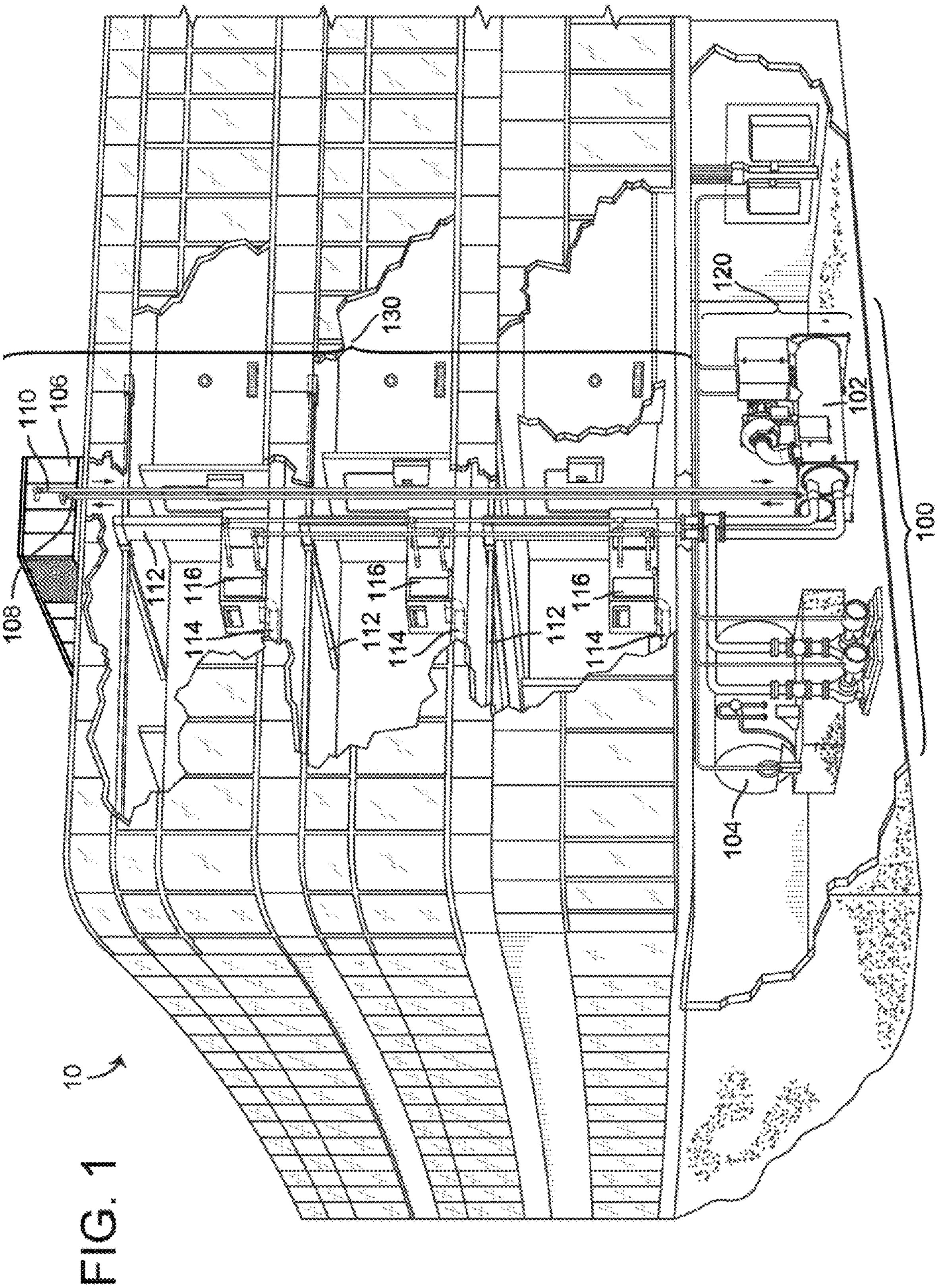
FIG. 1 is a drawing of a building equipped with a HVAC system, according to an exemplary embodiment.

Referring now to FIGS. 1-4, an exemplary building automation system (BAS) and HVAC system in which the systems and methods of the present invention can be implemented are shown, according to an exemplary embodiment. Referring particularly to FIG. 1, a perspective view of a building 10 is shown. Building 10 is served by a BAS. A BAS is, in general, a system of devices configured to control, monitor, and manage equipment in or around a building or building area. A BAS can include, for example, a HVAC system, a security system, a lighting system, a fire alarming system, any other system that is capable of managing building functions or devices, or any combination thereof.

The BAS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
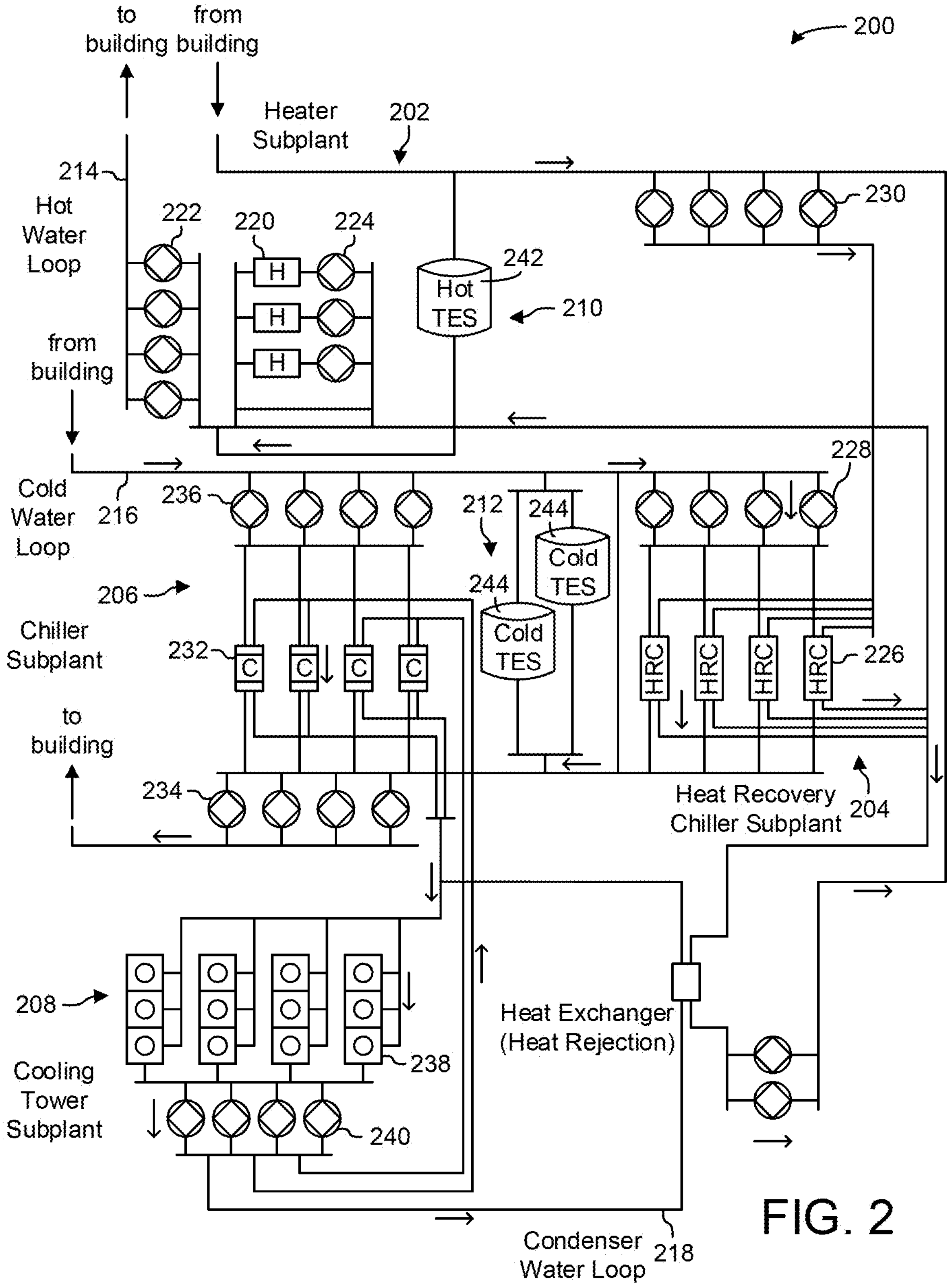
FIG. 2 is a block diagram of a waterside system that may be used in conjunction with the building of FIG. 1, according to an exemplary embodiment.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
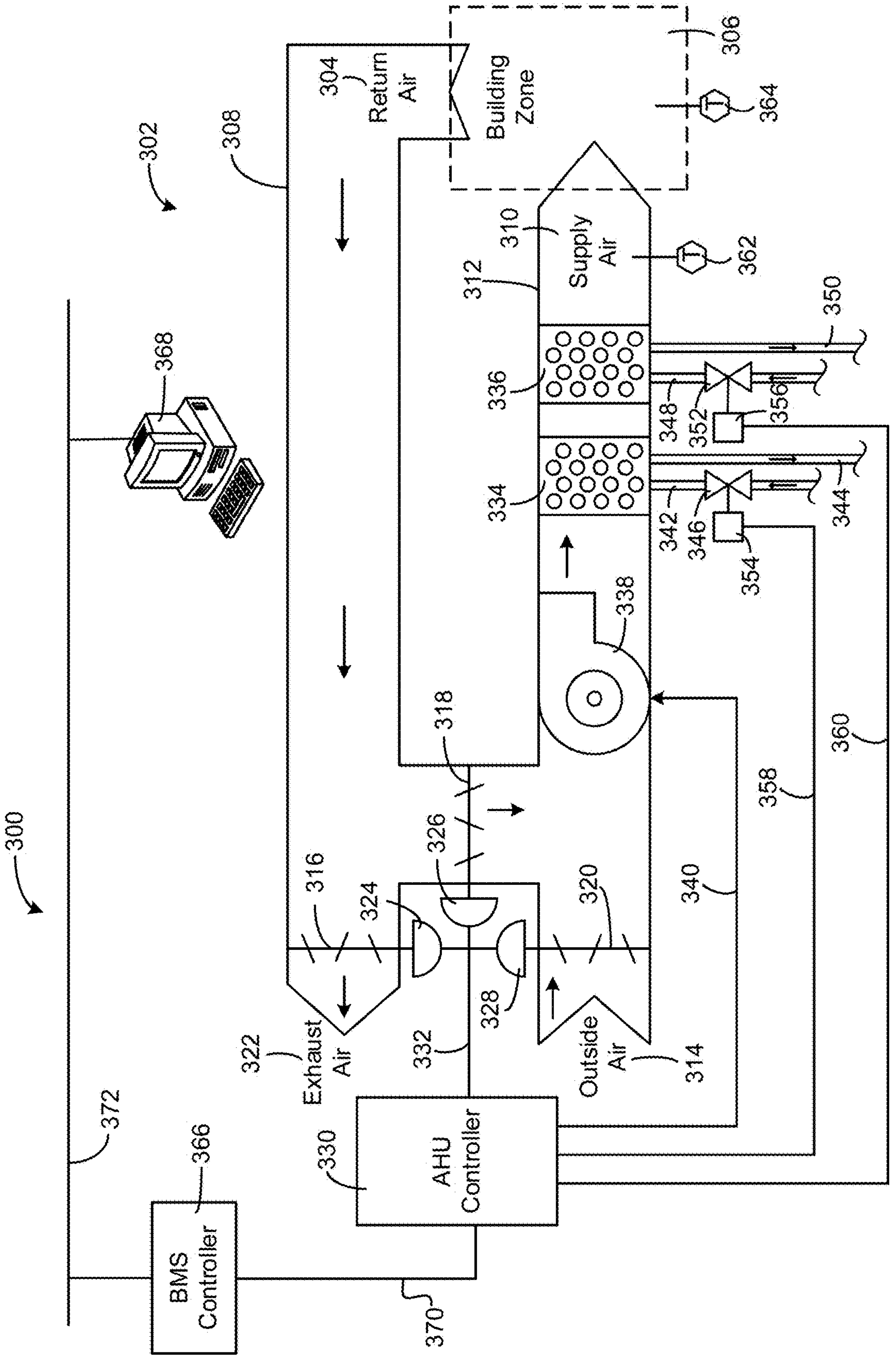
FIG. 3 is a block diagram of an airside system that may be used in conjunction with the building of FIG. 1, according to an exemplary embodiment.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BAS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BAS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building automation system (BAS) controller 366 and a client device 368. BAS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BAS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BAS controller 366 can be separate (as shown in FIG. 3) or integrated. In an integrated implementation, AHU controller 330 can be a software module configured for execution by a processor of BAS controller 366.

In some embodiments, AHU controller 330 receives information from BAS controller 366 (e.g., commands, setpoints, operating boundaries, etc.) and provides information to BAS controller 366 (e.g., temperature measurements, valve or actuator positions, operating statuses, diagnostics, etc.). For example, AHU controller 330 can provide BAS controller 366 with temperature measurements from temperature sensors 362-364, equipment on/off states, equipment operating capacities, and/or any other information that can be used by BAS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BAS controller 366 and/or AHU controller 330 via communications link 372.

Figure 4:
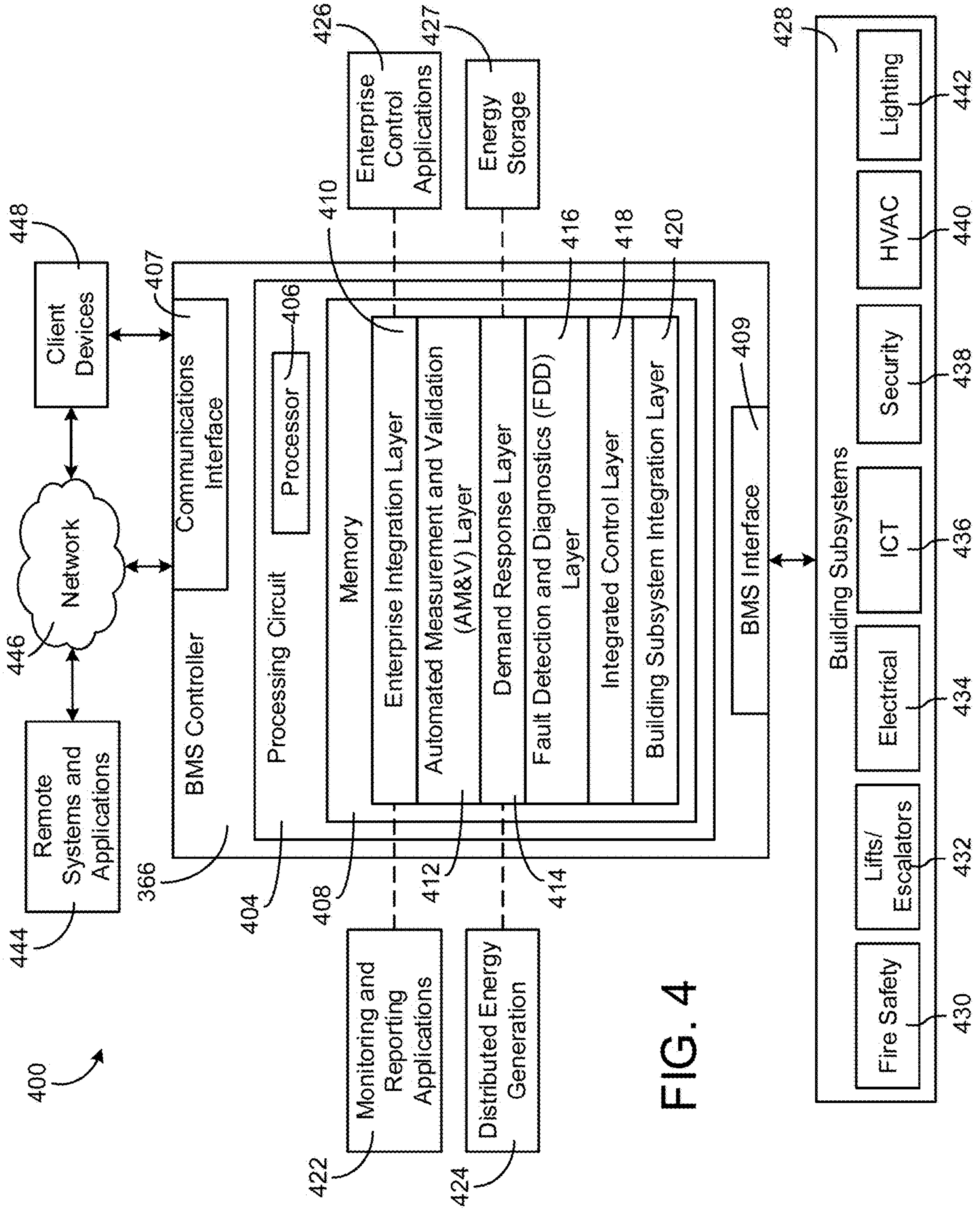
FIG. 4 is a block diagram of a building automation system (BAS) that may be used to monitor and/or control the building of FIG. 1, according to an exemplary embodiment.

Referring now to FIG. 4, a block diagram of a building automation system (BAS) (or BMS) 400 is shown, according to an exemplary embodiment. BAS 400 can be implemented in building 10 to automatically monitor and control various building functions. BAS 400 is shown to include BAS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BAS controller 366 is shown to include a communications interface 407 and a BAS interface 409. Interface 407 can facilitate communications between BAS controller 366 and external applications (e.g., monitoring and reporting applications 422, enterprise control applications 426, remote systems and applications 444, applications residing on client devices 448, etc.) for allowing user control, monitoring, and adjustment to BAS controller 366 and/or subsystems 428. Interface 407 can also facilitate communications between BAS controller 366 and client devices 448. BAS interface 409 can facilitate communications between BAS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BAS interface 409 is an Ethernet interface. In other embodiments, both communications interface 407 and BAS interface 409 are Ethernet interfaces or are the same Ethernet interface.

Still referring to FIG. 4, BAS controller 366 is shown to include a processing circuit 404 including a processor 406 and memory 408. Processing circuit 404 can be communicably connected to BAS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BAS controller 366 is implemented within a single computer (e.g., one server, one housing, etc.). In various other embodiments BAS controller 366 can be distributed across multiple servers or computers (e.g., that can exist in distributed locations). Further, while FIG. 4 shows applications 422 and 426 as existing outside of BAS controller 366, in some embodiments, applications 422 and 426 can be hosted within BAS controller 366 (e.g., within memory 408).

Still referring to FIG. 4, memory 408 is shown to include an enterprise integration layer 410, an automated measurement and validation (AM & V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BAS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BAS controller 366. In yet other embodiments, enterprise control applications 426 can work with layers 410-420 to optimize building performance (e.g., efficiency, energy use, comfort, or safety) based on inputs received at interface 407 and/or BAS interface 409.

Building subsystem integration layer 420 can be configured to manage communications between BAS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BAS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM & V) layer 412 can be configured to verify that control strategies commanded by integrated control layer 418 or demand response layer 414 are working properly (e.g., using data aggregated by AM & V layer 412, integrated control layer 418, building subsystem integration layer 420, FDD layer 416, or otherwise). The calculations made by AM & V layer 412 can be based on building system energy models and/or equipment models for individual BAS devices or subsystems. For example, AM & V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BAS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alarm a user to repair the fault before it becomes more severe.

Collaborative Building Network

Figure 5:
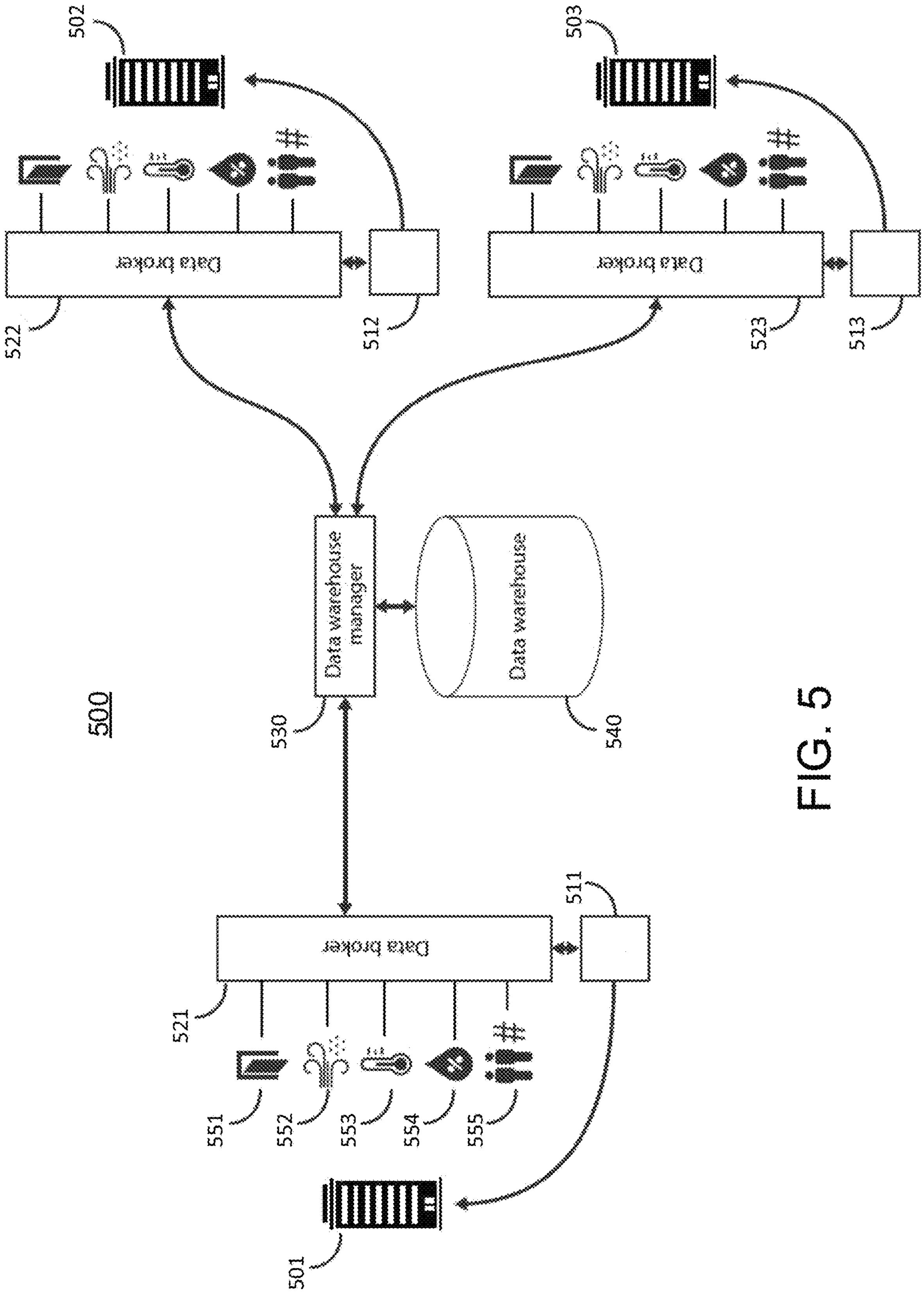
FIG. 5 is a block diagram of an example collaborative building network including three smart buildings, according to an exemplary embodiment.

FIG. 5 is a block diagram of an example collaborative building network 500 including three smart buildings 501, 502, and 503, according to an exemplary embodiment. The smart buildings 501-503 may be respectively connected to event predictors 511, 512, and 513, which are respectively connected to data brokers 521, 522, and 523. The data brokers 521-523 may be connected to a data warehouse manager 530, which is connected to a data warehouse 540. Furthermore, each of the smart buildings 501-503 may include a plurality of alarms (or data providers) such as forced entry data provider (or security alarm system) 551, air pollution data provider 552, temperature data provider 553, humidity data provider 554, and building occupancy data provider 555. Although the example collaborative building network 500 of FIG. 5 includes three smart buildings 501-503, embodiments are not limited thereto, and there may be fewer or more smart buildings that are connected to one another within the collaborative building network 500. Furthermore, although FIG. 5 shows that each smart building 501-503 is connected to the data providers 551-555, embodiments are not limited thereto, and each smart building 501-503 may include none, any, or all of the data providers 551-555. For example, the present disclosure does not require each smart building to have the same set of data providers for all smart buildings, and each smart building may include whatever type of data provider that may provide data.

The smart buildings 501-503 may be owned, occupied and/or operated by different entities. For example, company A may own or occupy smart building 501, company B may own or occupy building 502, and company C may own or occupy smart building 503.

Smart buildings 501-503 may include any building that includes or is connected to one or more sensors and a controller, e.g., BMS controller 366. The smart buildings 501-503 may also include one or more of the building subsystems 428. Furthermore, smart buildings 501-503 may include one or more of the data providers 551-555 within or around the buildings 501-503 that can sense the state and/or activities of its environment and provide data to the data broker 521-523 and/or the event predictor 511-513. For example, the smart buildings 501-503 (or the data providers 551-555) may include one or more Internet-of-Things (IoT) sensors, access control systems, HVAC systems, security systems, etc. The smart buildings 501-503 may be any distance from each other, e.g., next to each other in the same block, in different parts of the world, and any distance in between, so long as they are connected together within the same collaborative building network 500 or able to communicate with one another via a network (e.g., network 446).

The event predictors 511-513 may predict an event occurring in or around the smart building 501-503. The event predictors 511-513 may be implemented in the BMS controller 366 (e.g., FIG. 4) of each respective smart building 501 or separately implemented, which may be implemented in a BMS controller 366 of FIG. 4 for each smart building 501-503, such as another event predictor layer in the memory 408. The event predictor 511 may predict, for example, that the area around the smart building 501 may be flooded based on the data that the event predictor 511 received and analyzed (e.g., building 502 detected flooding around the area and provided the data to the collaborative building network 500). As another example, the event predictor 511 may predict that the walkways around the building 501 may have many pedestrians at a certain time based on data that the event predictor 511 received and analyzed (e.g., a major sporting event at a nearby stadium is predicted to end at a certain time).

When the event predictors 511-513 predict an event, information about the predicted event may be provided to the respective buildings 501-503, e.g., the BMS controller 366. For example, if the event predictor 511 predicts that it will rain at a certain time, the event predictor 511 may provide data to the building 501 including the prediction that it will rain and what time the event predictor 511 predicts that it will rain. Then the BMS controller 366 that is connected to the building 501 may respond to the receipt of the event prediction (e.g., rain at a certain time) by automatically closing the open windows in the building so that rain does not leak into the building. In some embodiments, the BMS controller 366 may respond by providing an alert to the building manager (e.g., via monitoring and reporting applications 422 and/or via remote systems and applications 444), rather than automatically closing the building. In addition to the data provided by the data brokers 521-523 via the data providers 551-555, the event predictors 511-513 may include data from other sources such as meteorological stations, local news channels, news articles, etc. This data may be used together with the data provided by the data providers 551-555 to more accurately predict events. As another example, when the event predictor 511 predicts that the noise level around the smart building 501 is predicted to be high at the end of a sport event, the event predictor 511 may provide this data to the smart building 501, and the smart building 501 may respond by automatically closing open windows and doors in order to reduce the noise from outside the smart building 501. In some embodiments, the smart building 501 may respond by alerting the smart building 501's occupants and/or building manager so that they may leave the building before the sporting event ends and the pedestrian paths become crowded.

In some embodiments, one or more of the event predictors 511-513 may use machine learning models to predict whether an event is likely to occur. For example, a machine learning model may be used to predict whether or not a flash flood may occur. The machine learning model may be trained using data provided by one or more of the data brokers. For example, for a machine learning model used by event predictor 511 that predicts air pollution levels, the machine learning model may be trained with the following as inputs: the building location (e.g., location of building that provided the data), air pollution level, wind speed and direction, and date and time that the data was acquired by the building that provided the data. The output of the machine learning model may include the actual levels of air pollution at the smart building 501 as outputs. The machine learning model may then be trained to predict the air pollution level around the smart building 501 at a certain time, based on the data it received from other smart buildings 502-503. Similar machine learning models may be built to predict other events such as temperature, pedestrian activity around the building, amount of sunlight, etc.

In some embodiments, instead of a machine learning model, rule-based prediction methodology may be used. For example, a rule for predicting the rain may include gathering data from buildings 502 and 503 and local weather reports about whether it is raining or overcast. Based on the satisfaction of some or all of these conditions, the event predictor 511 may predict that it is going to rain over the smart building 501 at a certain time.

In some embodiments, the event predictors 511-513 may determine that an event is likely to occur based on the satisfaction of a first threshold. For example, the event predictor 511 may determine that the probability of it raining over the smart building 501 is 70%. The event predictor 511 may include a rule which states that if the probability is greater than 50%, the event predictor 511 will predict that there will be rain over the smart building 501. In some embodiments, the event predictor 511 may provide both the event and the probability for which the event is likely to occur to the owner/occupant of the smart building 501 who can make the determination of whether or not to respond by, e.g., closing the windows and doors. In some embodiments, the controller of the smart building 501 may automatically respond if the probability is above a second threshold, which can be the same or different from the first threshold.

The data brokers (or data broker layer) 521-523 may each be integrated into the integrated controller layer 418 or a separate layer within the memory 408 of the BMS controller 366 of the BAS 400 of the smart building 501, 502, and 503, respectively. The data generated by each smart building 501-503 is compiled by local data brokers 521-523, which may exchange data with the data warehouse manager 530. The data received, processed, and transmitted by the data brokers 521-523 may include data from the data providers 551-555, other data providers not shown, third-party sources (e.g., weather reports, local news, etc.), and/or a database including relevant historical data provided by the data providers 551-555, other data providers not shown, and/or the third-party sources. Although not shown, each of the data brokers 521-523 may be connected to a database or a plurality of databases that store the data received by the data broker.

In some embodiments, the data brokers 521-523 may be operated/owned by an entity that is different from the entity that owns/operates the smart buildings 501-503. For example, the data brokers 521-523 may be operated by the same entity that operates the data warehouse manager 530 and/or the data warehouse 540. In this way, the owners/operators of the buildings 501-503 do not have to worry about managing how their dedicated data broker 521-523 interacts with other data brokers 521-523 and/or the data warehouse manager 530. For example, the owner/operator may not need to worry about the quality of the data they are generating and/or receiving, whether the contracts with the other owners/operators are being accurately executed. Accordingly, the data brokers 521-523 may give the building owner/operator a peace of mind.

The data brokers 521-523 may communicate with the data warehouse manager 530 and/or the other data brokers 521-523 within the collaborative building network 500. For example, the data broker 521 may provide data (e.g., share data) that is requested by the data broker 522 or the data broker 523. The requested data may be specific to the type of alarm or the type of event that the event predictor 512 is trying to prevent or it may be any and all data that is generated gathered by the data broker 521 within a specific time window. In some embodiments, there may exist a contract or agreement between the building managers of the smart buildings 501-502 such that they exchange collected data on a regular basis so that their respective event predictors 511 and 512 may predict events. In some embodiments, the agreement may provide that the data broker 521 may provide data to the data broker 522, whereas the building owner of the smart building 502 has to pay a certain amount to the building owner of the smart building 501. In some embodiments, the type and amount of data that gets shared may depend on the quality of the data which will be discussed further with reference to FIG. 8.

Each of the data providers 551-555 may provide relevant data to the data broker 521. For example, the forced entry data provider 551 may receive an alert from the smart building 501's alarm system that the alarm system has detected a forced entry into or within the building. Then the forced entry data provider 555 may provide data to the data broker 521 that includes the relevant information such as location of the incident, day and time of the incident, whether the culprit left the building, etc. The air pollution data provider 552 may provide data related to the amount of air pollution around the smart building 501 and the day/time of the air pollution reading by the air pollution sensor. The temperature data provider 553 may provide data related to the ambient and/or outdoor temperature of the smart building 552. The humidity data provider 554 may provide the amount of humidity in the atmosphere around the smart building 501 and the day/time of the humidity. The occupancy data provider 555 may provide the occupancy level of the smart building 501 and the day/time of the occupancy reading.

In some embodiments, each of the data providers may include one or more sensors that collect data related to the data provider. The data may be first collected by the sensors as attributes or conditions, such as temperature, air pressure, air pollution, amount of traffic, occupancy, etc. For example, the air pollution data provider 552 may include an air pollution sensor that may output the air pollution reading to the data broker 521. As another example, the forced entry data provider 551 may include an alarm system for the smart building 501 that may output the data related to the forced entry incident in and/or around the smart building 501.

For each of these data providers 551-555, more detailed data may be provided. For example, depending on how tall the smart building 501 is, the temperature data provider 553 may provide multiple temperatures, the elevation of the thermometer that provided the temperature, and the day and time of that temperature. Similarly, the occupancy data provider 555 may provide data on how occupied the building 501 as well as how many people are in each floor of the building and/or how many people are within the grounds of the smart building 501 (e.g., parking structure, outdoor dining area, etc.). Furthermore, additional types of data providers may be contemplated. For example, there may be a data provider that may provide how much sunlight is shining on the smart building 501 at a particular day/time. There may also be a data provider that provides the noise level in and/or around the smart building 501, e.g., when there is a parade or fight outside, or there is a plane passing by, or there is a group of cars with sirens passing by, etc. Each of the data providers 551-555 may provide the respective data upon request (e.g., by the data broker 521, a building manager, the data warehouse manager, etc.) and/or on a regular or substantially regular basis (e.g., hourly, daily, etc.).

The data warehouse manager 530 may be used as a medium to share the data between the data brokers 521-523. In some embodiments, the data warehouse manager 530 may function like an escrow account. For example, when the data broker 521 requests data from the data broker 522, the data broker 521 may generate a transaction request indicating that the data broker 521 is requesting data from the data broker 522 for a certain payment amount. This transaction request may be transmitted to the data warehouse manager 530 which can then wait to receive the data from the data broker 522 and the payment from the data broker 521 (or confirmation of a payment in an escrow account). And upon receipt of both the payment and the data, the data warehouse manager may dispense both the data and the payment to the respective parties. In some embodiments, the data warehouse manager 530 may grade the data as described in further detail below with respect to FIG. 8.

In some embodiments, the event predictors 511-513 may place requests with the data brokers 521-523 to obtain specific types, frequencies, or sources of data in response to the shared data. For example, if analysis of the shared data indicates that a storm was approaching the smart building 501, the event predictor 511 may request an increase in the frequency of wind speed data from the smart building 503 and make a new request to retrieve wind speed data from smart building 502, depending on their relative geographic locations. Data broker 521 may then create new or updated transactions with the data warehouse manager 530. After event predictors 511-513 analyze the data and predict future trends, the data is passed on to building systems.

In some embodiments, data warehouse manager 530 may be used to organize the initial setup of an exchange. For example, the data warehouse manager 530 may provide a directory of available data. After a desired source of data is identified, data brokers 521-523 may negotiate directly with each other, and establish direct data subscriptions without the use of a centralized system.

Data warehouse 540 may be used by data warehouse manager 530 to store copies of the shared data. In some embodiments, the data warehouse manager 530 may control the data warehouse 540. The length of retention of the shared data may be set by the data supplier (e.g., the data broker that provided the data). For example, the data broker 521 may indicate that the data provided by the data broker 521 may only be saved (or retained) in the data warehouse for a certain number of days. In some embodiments, when the expiration time passes, the data warehouse 540 may automatically delete the data provided by the data broker 521. In some embodiments, the data brokers 521-523 may indicate certain sets of data may be retained for certain periods of time. For example, the data broker 521 may indicate that any data provided by the forced entry data provider 551 may be retained for 7 days, whereas the data provided by the occupancy data provider 555 may be retained for 2 years. The data broker 521 may also place a fee (e.g., licensing fee) on the data that it provides such that when data broker 522 or data broker 523 wants to obtain historical data provided by the data broker 521, there is a fee that must be provided by the requesting data broker.

In some embodiments, the collaborative building network 500 may include non-smart (or regular) buildings. For example, the non-smart building may not have one or all of the components described with respect to a smart building (e.g., the data providers 551-555, event predictor 511, and/or data broker 521). The owner/occupant of the non-smart building may receive the prediction using the BMS controller 366 who can then respond to the prediction.

Figure 6:
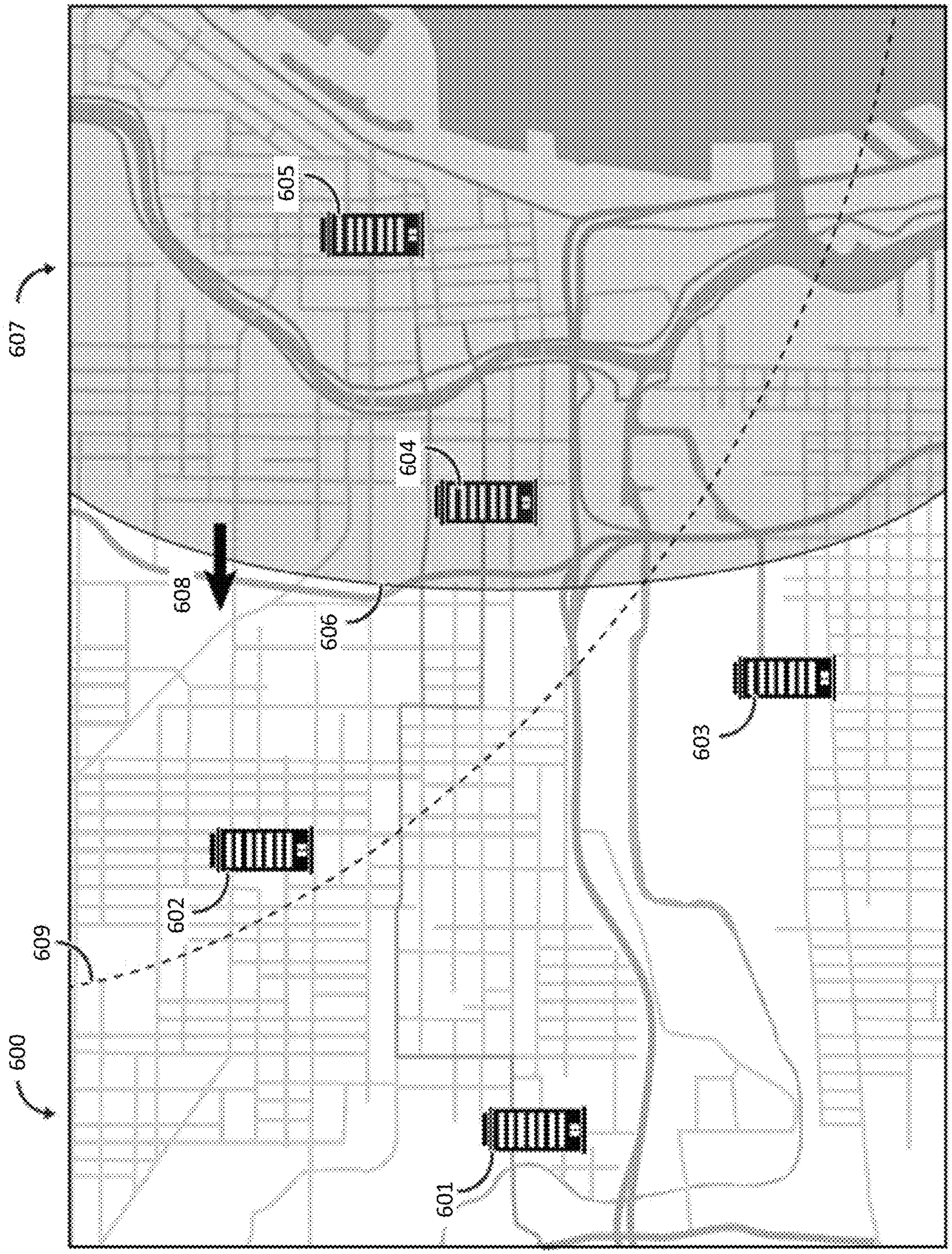
FIG. 6 is a block diagram of an example collaborative building network including a plurality of buildings in an example city, according to an exemplary embodiment.

FIG. 6 is a block diagram of an example collaborative building network including a plurality of buildings in an example city, according to an exemplary embodiment. Buildings 601 to 605 may include smart buildings (e.g., smart buildings 501-503) that are geographically distributed across a city. In the example described in FIG. 6, a cold front 606 is moving from east to west in the direction of arrow 608. The region 607 of the city to the east of the front may be experiencing precipitation, such as rain, hail, or snow. Although this example is described with respect to a cold front with precipitation, embodiments are not limited thereto. In some embodiments, the collection of smart buildings may detect a variety of weather patterns based on the sensed data and predicted events.

Each of the buildings 604 and 605 may record time-stamped data related to the precipitation using a weather data provider that provides data to a data broker of the buildings 604 and 605. Because the building 605 is to the east of building 604, the building 605 detected the cold front and the precipitation data earlier than the building 604. By comparing the times at which precipitation was detected at buildings 604 and 605, the velocity of weather front 606 can be calculated, and a time of arrival at buildings 601, 602, and 603 can be predicted. Upon receipt of an event prediction by the respective event predictors that are associated with the buildings 601, 602, and 603, each of the buildings 601-603 (e.g., via their associated BMS controller 366) may undertake manual or automatic responses that include, e.g., alerting the building's occupants, deploying floor mats or robotic cleaners to deal with moisture at the building's entrances, and automatically closing windows.

In some embodiments, the accuracy of the information may improve as more buildings record the passing of the weather front. For example, if the building 602 detects precipitation, but the building 603 does not, then that may indicate that predicted weather front 609 is a more accurate representation than the weather front 606. Accordingly, the building 601 may more accurately predict the cold front based on the additional data from the buildings 602 and 603 provides.

Additional examples of using the collaborative building network are contemplated. The recitation of these examples are not meant to be limiting, and one of ordinary skill with recognize that there are other examples of utilizing the collaborative building network that are not explicitly mentioned within this disclosure.

For example, a highly localized meteorological events, such as lightning or a tornado, may be tracked more accurately to identify at-risk buildings in the predicted path.

As another example, a drifting cloud of pollution detected by air quality sensors of buildings may trigger other buildings to reconfigure their HVAC system, such as recirculating a higher proportion of air or switching to intakes that have increased filtering.

As further example, the detection of fire in one building may trigger an increased level of alert or evacuation in a nearby building.

As a further example, the detection of a security event, such as a broken window, in one building may trigger an increased level of alert in nearby buildings or nearby buildings may also direct one or more closed-circuit television (CCTV) cameras towards the affected building in an effort to capture video of any criminal activities.

Furthermore, increased pedestrian activity near one building may predict an increase in pedestrian activity near another building at a future point in time. For example, crowds leaving a sports venue and heading towards transport terminals. In response, an access control system may close an exit that would lead people out into the crowd, and redirect building users to an alternative exit.

As another example, the use of IR cameras, temperature sensors, or self-reporting from individuals could be used to identify cases of a contagion, such as COVID-19. Identification in one building can trigger other buildings to reduce the recirculation of air in the HVAC system, prompt a re-testing of building occupants, increases in infection-management control, such as increased cleaning, or some other response to reduce the risk of transmission.

Accordingly, smart buildings within a collaborative building network may advantageously be able to save money and the comfort of the building's occupants by predicting various events in and around the smart buildings. Based on those events, various controls may be manually or automatically activated such that any discomfort, damage or negative effect is minimized or mitigated.

Figure 7:
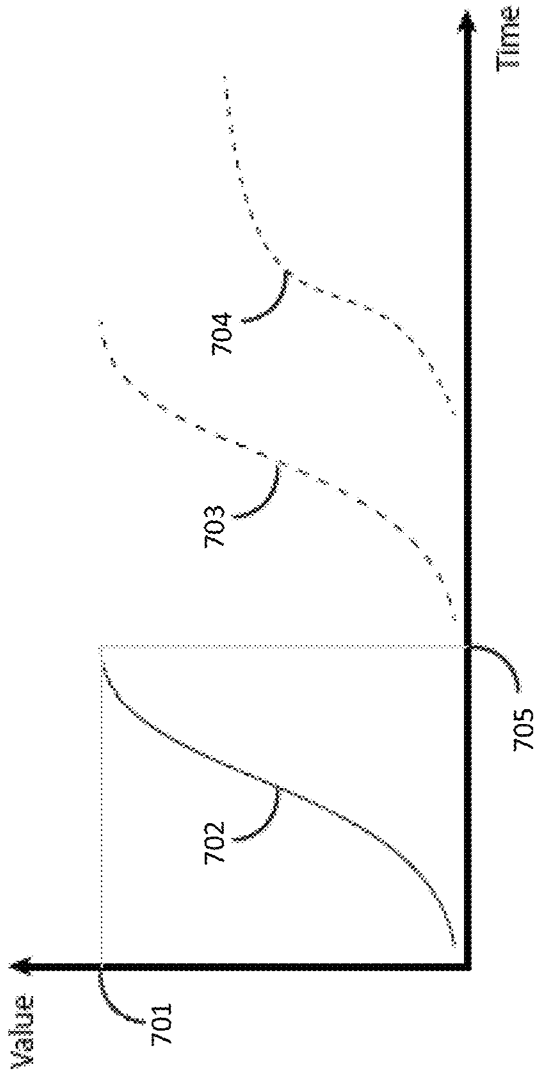
FIG. 7 shows line graphs of example prediction curves based on a machine learning model, according to an exemplary embodiment.

FIG. 7 shows line graphs of example prediction curves based on a machine learning model, according to an exemplary embodiment. The x-axis indicates time, and the y-axis indicates any predicted parameter value, e.g., any variable that is quantifiable in a smart building, such as air temperature, precipitation rate, building occupancy, alarm level, etc. Curve 702 represents historical data recorded by a first building (e.g., building 605), curve 703 includes a prediction curve determined by the event predictor of a second building (e.g., building 603), and curve 704 includes a prediction curve determined by the event predictor of a third building (e.g., building 601). X-intercept 705 indicates the current time, and y-intercept 701 indicates the measured or sensed value of the value of curve 702.

Predicted curve 703 is offset in time but follows a similar shape as the shape of curve 702 because the event predictor of the second building predicts that the predicted value for the second building will be the same as that of curve 702. This may be due to several reasons. For example, if the value is measuring wind speed, and if the second building may be close to the first building, whatever the first building is experiencing may be reasonably similarly experienced by the second building later in time. In such case, the event predictor of the second building may request via the connected data broker to receive current weather data from the data broker of the first building.

Predicted curve 704 is further offset in time from curve 703, but has a different shape than curves 702 and 703. This may be due to a variety of reasons such as more uncertainty in the data or farther distance between the first and third buildings than the distance between the first and second buildings. The machine learning model associated with the third building may adjust predicted the curve 704 after the second building records an actual increase in the parameter value. In some embodiments, the event predictor for the third building may combine data received from the first and second buildings to develop a more accurate machine learning model for the third building.

Figure 8:
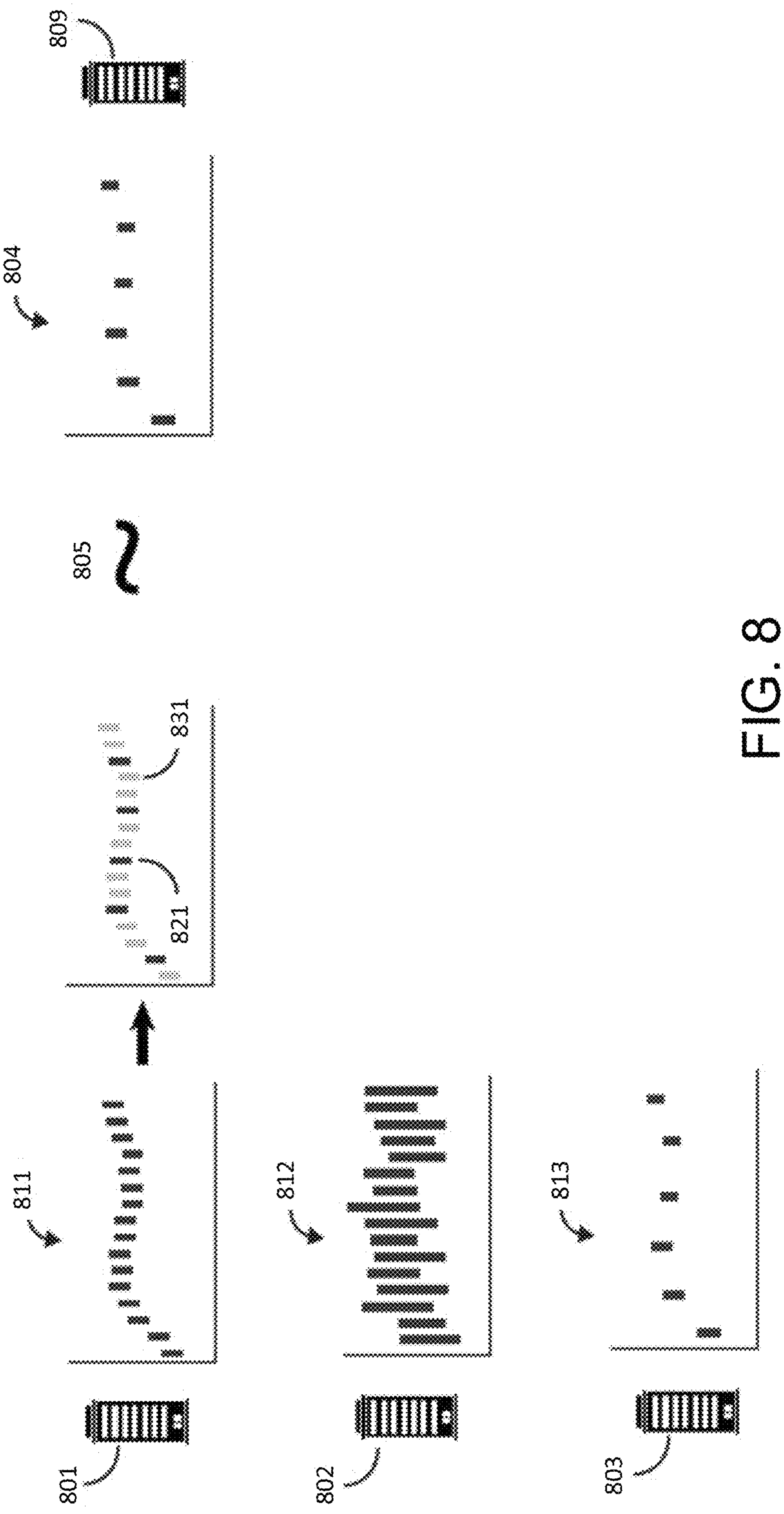
FIG. 8 illustrates an example process of addressing an imbalance in the grade of data within an example collaborative building network, according to an exemplary embodiment.

FIG. 8 illustrates an example process of addressing an imbalance in the grade of data within an example collaborative building network, according to an exemplary embodiment. Different buildings may include different sensors that capture data at different frequencies (or sampling rates) and with different precision (or accuracy). For example, some buildings may have sensors that provide high accuracy data at high frequency, whereas some other buildings may have other sensors that provide mediocre or low accuracy data at medium or low frequencies. Different building owners/occupants may desire to be compensated for providing high accuracy and high frequency data.

The example collaborative building network of FIG. 8 may include smart buildings 801, 802, 803, and 804. Smart building 801 may generate data 811 that is high in both accuracy and frequency. Smart building 802 may generate corresponding data 812 that is high in frequency but has a high margin of error. Smart building 803 may generate data 813 that is high in accuracy, but logged less frequently. Smart building 809 may be waiting to receive data.

As part of establishing a balanced sharing, the data broker for building 801 may provide reduced quality data 804 to the smart building 809. Various methods 805 may be used to reduce the quality, such as reducing the sampling frequency by transmitting every $n^{th}$ data sample 821 and withholding the remaining data 831.

In some embodiments, the data broker may provide the data 811 with sharing rules (e.g., as metadata) to the data warehouse manager which may store the data with the sharing rules in the data warehouse. Then whenever a data broker requests data provided by the building 801, the sharing rules may be applied prior to the data being provided to the requesting data broker. In some embodiments, the sharing rules may state that the requesting data broker receive data that is modified with lower precision and/or lower frequency. In some embodiments, the sharing rules may state that the requesting data broker receive data without modification.

In some embodiments, smart building 809 may receive data 812 from the smart building 802 or data 813 from the smart building 803. In some embodiments, the smart building 809 may receive the raw (or unfiltered or unmodified) data 811 from the building 801. The owner/occupant for the smart building 801 may require financial compensation or other form of compensation from the owner/occupant of smart building 809.

For example, a high quality CCTV installed in a first building may capture a portion of the area around the first building with high quality and high rate (or frequency). A low quality CCTV installed around a second building that may capture a portion of the area around the second building may have low quality and a low rate. Nonetheless, the first building and the second building may desire to obtain each other's CCTV data, but the first building's manager may desire some kind of compensation to account for the fact that data from the first CCTV has a quality and rate that are much better than that of the second CCTV. How the first owner/occupant is compensated may depend on the agreement between the owners/occupants of the first building and the second building. For example, the first owner/occupant may request financial compensation from the second owner/occupant for the difference in quality. In another example, the first owner/occupant may intentionally lower the quality of the data by, for exampling, sampling the data or reducing the resolution of the CCTV video data provided to the second owner/occupant's data broker. As another example, the second owner/occupant may need to provide other data from the second building's data broker such as weather data or alarm system data without anything in return from the first owner/occupant.

In some embodiments, the sharing and use of data takes into account the level of trust between the two parties. For example, a smart building may report that its sensor data has a high level of accuracy, but there may not be any evidence to prove or disprove that claim. Untrusted data may receive a lower grade. Untrusted data may be accompanied by metadata that identifies the data as untrusted, which may affect the level of confidence assigned to predictions derived from the data. Trust in data may increase based on providing evidence of accuracy, analyzing historical data, through some feedback rating system, or another method.

Figure 9:
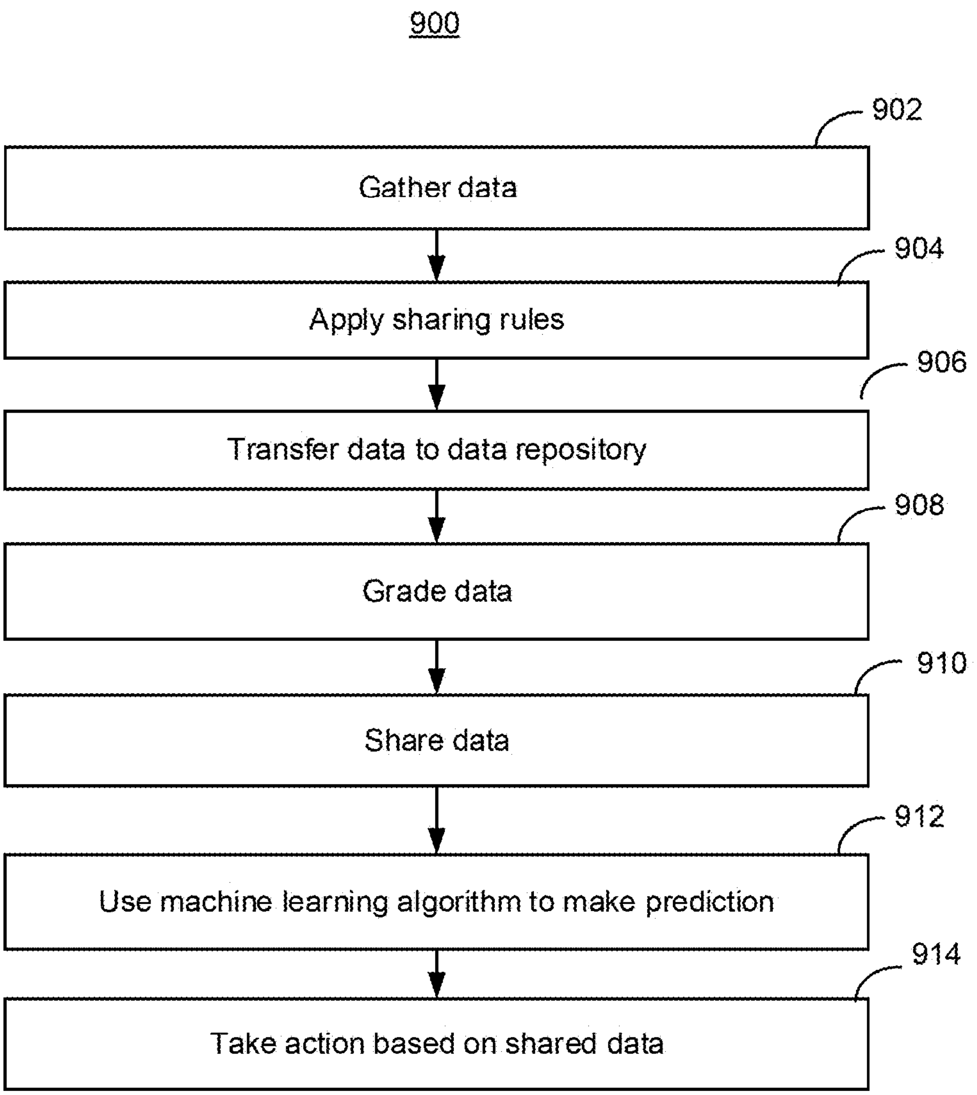
FIG. 9 is an example process of operating an example collaborative building network, according to an exemplary embodiment.

FIG. 9 is an example process 900 of operating an example collaborative building network, according to an exemplary embodiment. Although certain steps are shown and described in a particular order, embodiments are not limited thereto. Depending on the embodiment, the order of these steps may be modified, certain steps may be removed, and additional steps may be added.

In step 902, the data broker for a first building may gather data from sources within or around the smart building such as IoT sensors, access control system, HVAC system, and fire alarm system as well as third party sources such as news articles and weather stations. The data may be collected using any of the methods described within this disclosure.

In step 904, the data broker for the first building may apply sharing rules to the collected data. The sharing rules may indicate which external parties the data may be shared with and what kind of data may be shared (e.g., forced entry data, air pollution data, any combination of data, all data, etc.). The sharing rules may also define the quality of the data with which the data may be shared by the data broker. For example, certain sharing rules may state that for certain recipients, data will be provided in the same quality as they are collected. Certain other sharing rules may state that for certain recipients, the data will be provided with lower precision than the precision with which they were collected and/or with lower frequency (or rate) than the frequency with which they were collected.

In some embodiments, the sharing rules may state that certain kinds of data will omit the originator of the data. For example, if a bank is part of the collaborative building network, the bank may wish to not share that there was a forced entry within the bank at a certain time. However, this data may still be helpful for others within the collaborative building network. Accordingly, the bank may provide the data describing the forced entry including how many people, how long, etc. but without providing the fact that the forced entry occurred at the bank.

The sharing rules may also include and/or depend on the relationship between the buildings and/or entities. For example, the sharing rules may include a rule that states that the data will be shared and/or received from another building if the building is located within a certain distance from the receiving building/entity. For example, a first building that is 100 miles away may have collected data related to the traffic around the building, but that data may not be particularly helpful or useful for the second building. However, if the first building is two blocks away from the second building, the traffic data from the first building may be helpful for the second building. Accordingly, the first building may have a rule that states that the traffic data will not be shared with the second building or the second building may have a rule that states the traffic data will not be received from the second building. Furthermore, different types of data may have different amounts of relevance and/or importance based on how far they are. For example, even though traffic data for a first building that is 100 miles away may not be particularly helpful for the second building, the weather data from the first building may still be useful for the second building.

The sharing rules may also be based on other factors such as types of equipment that the building has, types of sensors, the sizes of the equipment, the physical characteristics of the building (size, materials, etc.), etc. The sharing rules may also be different depending the entity with which the data is shared. For example, the sharing rules a first entity has with a second entity may be different that the sharing rules the first entity has with a third entity. The sharing rules may also be set from the sharing entity or the rules may be set from the receiving entity.

Furthermore, the sharing rules may include rules that filter out some data acquired by the first building. For example, the sharing rules may indicate that some of the data to be sent to the second building/entity may be filtered out, depending on the relationship and/or contract between the first and second entities. For example, the sharing rules may indicate that only high-quality and/or high-frequency/accuracy/precision data may be provided from the first entity to the second entity. In some embodiments, the sharing rules may indicate that only low-quality and/or low-frequency data may be provided. Still in some other embodiments, the sharing rules may indicate that all data acquired by the first building is shared with the second entity.

In step 906, the data broker may provide the data to the data warehouse manager including metadata to indicate any sharing rules that relate to the data. The data warehouse manager may store the data in the data warehouse with the sharing rules. In some embodiments, the data broker may provide the data directly to the recipient data brokers of other smart buildings with the sharing rules applied.

In step 908, the data may be graded based on factors such as accuracy, frequency, or a premium associated with location. For example, there may be a premium attached to a building's data if the building is the only data provider within a geographic area or at an extreme edge of a cluster of smart buildings. The grading may be applied by the data warehouse manager. In some embodiments, when the data is provided directly by the data broker, the data broker may grade the data using a set standard for the collaborative building network.

In step 910, the data warehouse manager may facilitate sharing the data based on pre-established contracts between the owners/occupants of the buildings. Where there is an asymmetry in the sharing that is offset by financial compensation, the data warehouse manager or other system may keep a record of the sharing and resulting bill. Settlement of the bill may be performed daily, monthly, or through some other mutually agreed schedule.

In step 912, the smart building (or the associated event predictor) may use a machine learning algorithm to make a prediction of the event based on the shared/received data.

In step 914, the smart building may trigger automatic responses or notify building occupants to take manual actions based on the predicted event from the event predictor.

In the described embodiment, grading and sharing is performed by a centralized system, but analysis is performed by each individual data recipient. In some embodiments, centralized analysis could be performed and provided as a subscription service, with provided data offsetting the subscription cost.

Automating Identification of Milestone Event

In the lifecycle of a building, there are many milestone (or substantial) events that may occur. For example, a milestone event may include a building equipment being replaced with newer equipment. As another example, another milestone event may include the equipment completely breaking down or partially breaking down such that the performance is degraded but still functional. As a further example, another milestone event may include when the equipment was damaged due to an external factor such as flooding or impact. Other milestone events may include loss of power in the building or the building equipment, reduction in demand and consumption, multi-day power outage, change in service provider, or replacement of equipment and/or controls.

Building managers often want to compare the performance of the building equipment before and after the milestone event, but because this is difficult to do automatically, building managers have to go back and manually determine when the milestone event occurred. The process of comparing the performance of the building equipment before the milestone event with the performance of building equipment after the milestone event can be difficult. Accordingly, there is a need for the identification of the milestone event and when the milestone event occurred.

In some embodiments, the BMS controller 366 may include a layer that predicts the occurrence of a milestone event. The milestone event may be predefined with a list of preset milestone events that is determined by the user or provided by the provider of the BMS 400. In some embodiments, the milestone event may be determined by the user to include any event that the user subjectively determines is a milestone event. For example, the user may determine that a milestone event occurs when a piece of building equipment's efficiency drops below a certain threshold. This efficiency drop may not be immediately identified due to delays in production of data and calculations. Nonetheless, the user may wish to categorize the drop in efficiency below the threshold as a milestone event. As another example, the user may determine that downtime (e.g., for repairs, maintenance, malfunction, or any other reason) is a milestone event.

In order to automatically identify when a milestone event occurs, machine learning models may be used to predict when the milestone event occurs. For example, a machine learning model that predicts the milestone event of a drop in efficiency may be deployed within the BMS 400 (e.g., in BMS controller 366). Once the machine learning model determines that the milestone event occurred, the result can be provided to the user who can verify whether the milestone event actually occurred. With this verification, the user may help train the machine learning model to more accurately predict the milestone event. And by predicting when the milestone event occurred, the user may be able to compare the performance of the building equipment before against the performance after the milestone event. These comparisons may be visually displayed in a user's terminal such as client device 448.

Accordingly, milestone events may be automatically identified without the need for the building manager to determine when a milestone event occurred. By automatically determining when the milestone event occurred, the user is able to easily set parameters in their terminals to compare the performance of various building equipment before and after the milestone event.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed is:

1. A method of operating a building management system, comprising:

acquiring, by a first computing system, data using one or more sensors of a first building of a first entity;

grading the acquired data based on sampling rate of the acquired data;

providing, by the first computing system, a set of sharing rules for the graded data;

determining, by the first computing system by applying the set of sharing rules and based on the graded data, whether to share the graded data with a second computing system associated with a second building of a second entity; and providing, by the first computing system, the graded data to the second computing system responsive to the determination.

2. The method of claim 1, wherein the first computing system is connected to the first building.

3. The method of claim 1, wherein the first computing system includes a server connected, via a network, to the second computing system and a third computing system connected to the first building.

4. The method of claim 3, further comprising facilitating, by the first computing system, sharing of the graded data between the first entity and the second entity.

5. The method of claim 4, further comprising facilitating, by the first computing system, sharing of the graded data between the first entity and a third entity based on the set of sharing rules, wherein the sharing rules for the second entity is different from the sharing rules for the third entity.

6. The method of claim 1, wherein grading of the acquired data includes filtering out at least some of the acquired data based on the grading.

7. The method of claim 1, further comprising:

predicting an event that will impact occupants of the second building based on the graded data.

8. The method of claim 7, further comprising operating building equipment in response to the predicted event.

9. The method of claim 1, wherein the graded data includes data related to at least one of the following: a weather event, occupancy, criminal activity, atmospheric quality, environmental condition, or pedestrian activity.

10. A non-transitory computer-readable storage medium having instructions stored thereon that, when executed by one or more processors, cause the one or more processors to:

acquire data using one or more sensors of a first building of a first entity;

grade the acquired data based on sampling rate of the acquired data;

provide a set of sharing rules for the graded data;

determine, by applying the set of sharing rules and based on the graded data, whether to share the graded data with a second processor associated with a second building of a second entity; and provide the graded data to a second processor responsive to the determination.

11. The non-transitory computer-readable storage medium of claim 10, wherein the instructions further cause the one or more processors to:

facilitate sharing of the graded data between the first entity and the second entity.

12. The non-transitory computer-readable storage medium of claim 10, wherein the instructions further cause the one or more processors to:

filter out at least some of the graded data based on the set of sharing rules.

13. The non-transitory computer-readable storage medium of claim 10, wherein the instructions further cause the one or more processors to:

receive data, from the second processor, acquired using one or more sensors of the second building of the second entity.

14. The non-transitory computer-readable storage medium of claim 10, wherein the instructions further cause the one or more processors to:

predict an event that will impact occupants of the second building based on the graded data; and operate building equipment in response to the predicted event.

15. A building management system, comprising:

one or more storage devices storing instructions thereon; and one or more processors, wherein the one or more processors execute the instructions causing the one or more processors to:

acquire data using one or more sensors of a first building of a first entity;

grade the acquired data based on sampling rate of the acquired data;

provide a set of sharing rules for the graded data, wherein the rules comprise rules regarding at least one of what data can be shared, how much of the data can be shared, and how frequently it can be shared;

determine, by applying the set of sharing rules and based on the graded data, whether to share the graded data with a second processor associated with a second building of a second entity; and provide the graded data to the second processor responsive to the determination.

16. The building management system of claim 15, wherein the one or more processors are further configured to receive data, from the second processor, acquired using one or more sensors of the second building of the second entity.

17. The building management system of claim 16, wherein the one or more processor are further configured to:

predict an event that will impact occupants of the second building based on the data received from the first building; and operate a building equipment in response to the predicted event.

18. The building management system of claim 17, wherein the one or more processors are further configured to train a machine learning model used to predict the event based on the graded data and input of whether the predicted event occurred.

* * * * *